United States Patent
Chung et al.

(10) Patent No.: US 11,303,195 B2
(45) Date of Patent: Apr. 12, 2022

(54) PARTIAL ZERO VOLTAGE SWITCHING (ZVS) FOR FLYBACK POWER CONVERTER AND METHOD THEREFOR

(71) Applicant: SEMICONDUCTOR COMPONENTS INDUSTRIES, LLC, Phoenix, AZ (US)

(72) Inventors: BongGeun Chung, Siheung-si (KR); Souhib Harb, Issaquah, WA (US); Kai-Fang Wei, San Jose, CA (US)

(73) Assignee: SEMICONDUCTOR COMPONENTS INDUSTRIES, LLC, Phoenix, AZ (US)

( * ) Notice: Subject to any disclaimer, the term of this patent is extended or adjusted under 35 U.S.C. 154(b) by 32 days.

(21) Appl. No.: 17/034,938

(22) Filed: Sep. 28, 2020

(65) Prior Publication Data
US 2021/0119526 A1   Apr. 22, 2021

Related U.S. Application Data

(60) Provisional application No. 62/924,183, filed on Oct. 22, 2019.

(51) Int. Cl.
*H02M 3/335* (2006.01)
*H02M 1/08* (2006.01)

(52) U.S. Cl.
CPC ....... *H02M 1/083* (2013.01); *H02M 3/33592* (2013.01)

(58) Field of Classification Search
CPC ............ H02M 1/0032; H02M 1/0048; H02M 1/0054; H02M 1/0058; H02M 1/44;
(Continued)

(56) References Cited

U.S. PATENT DOCUMENTS 6,198,638 B1   3/2001  Lee
8,773,871 B2   7/2014  Djenguerian et al.
(Continued)

OTHER PUBLICATIONS

Michael T. Zhang, Milan M. Jovanovic and Fred C. Y. Lee; white paper; "Design Considerations and Performance Evaluations of Synchronous Rectification in Flyback Converters"; IEEE Transactions on Power Electronics; vol. 13, No. 3; May 1998; 9 pages.
(Continued)

*Primary Examiner* — Gary L Laxton
(74) *Attorney, Agent, or Firm* — Polansky & Associates, P.L.L.C.; Paul J. Polansky

(57) ABSTRACT

A controller is for use in a power converter having a flyback transformer having a primary winding switched by a primary side transistor and a secondary winding switched by a secondary side transistor. The controller includes a line voltage detection circuit that activates a high line detect signal in response to detecting that an input line voltage is greater than a first threshold, a discontinuous conduction mode detection circuit activates a discontinuous conduction mode signal in response to detecting that the controller is operating in discontinuous conduction mode, and a switching controller coupled to the line voltage detection circuit and to the discontinuous conduction mode detection circuit that controls the primary side transistor and the secondary side transistor using partial zero voltage switching in response to an activation of the high line detect signal and the discontinuous conduction mode signal, and without using partial zero voltage switching otherwise.

20 Claims, 6 Drawing Sheets

(58) Field of Classification Search
CPC ............. H02M 3/335; H02M 3/33507; H02M 3/33569; H02M 3/33576; H02M 3/33592
See application file for complete search history.

(56) References Cited

U.S. PATENT DOCUMENTS

| | | | |
|---|---|---|---|
| 9,136,765 | B2 | 9/2015 | Balakrishnan et al. |
| 9,166,486 | B2 | 10/2015 | Matthews et al. |
| 9,374,011 | B2 | 6/2016 | Liu et al. |
| 9,444,357 | B1 | 9/2016 | Matthews et al. |
| 9,584,027 | B2 | 2/2017 | Polivka |
| 9,742,288 | B2 | 8/2017 | Balakrishnan et al. |
| 9,762,129 | B2 | 9/2017 | Balakrishnan et al. |
| 9,929,656 | B2 | 3/2018 | Matthews et al. |
| 10,243,442 | B1 | 3/2019 | Balakrishnan et al. |
| 10,855,192 | B1 * | 12/2020 | Yang ................... H02M 1/0061 |
| 2017/0155335 | A1 * | 6/2017 | Chang ................... H02M 1/08 |
| 2017/0366102 | A1 * | 12/2017 | Kikuchi ................. H02M 1/36 |
| 2018/0115252 | A1 | 4/2018 | Chang et al. |
| 2018/0226895 | A1 | 8/2018 | Song et al. |
| 2018/0358902 | A1 | 12/2018 | Duvnjak |
| 2019/0020277 | A1 * | 1/2019 | Liu ........................ H01L 23/50 |

OTHER PUBLICATIONS

Jong-Jae Lee, Jung-Min Kwon, Eung-Ho Kim, Woo-Young Choi and Bong-Hwan Kwon; white paper "Single-Stage Single-Switch PFC Flyback Converter Using a Synchronous Rectifier"; IEEE Transactions on Industrial Electronics; vol. 55, No. 3; Mar. 2008; 14 pages.

Hiroki Watanabe and Jun-Ichi Itoh; white paper; "Zero Voltage Switching Scheme for Flyback Converter to Ensure Compatibility with Active Power Decoupling Capability"; IPEC-Niigata 2018—ECCE Asia conference; Niigata, Japan; May 2018; 8 pages.

International Search Report for International Application No. DE102020127618.4; dated Nov. 24, 2021; 7 pages.

* cited by examiner

PARTIAL ZERO VOLTAGE SWITCHING (ZVS) FOR FLYBACK POWER CONVERTER AND METHOD THEREFOR

FIELD OF THE DISCLOSURE

This disclosure relates generally to power converters, and more specifically to power converters using flyback transformers.

BACKGROUND

Switched mode power supplies can be used to create a direct current (DC) voltage from an alternating current (AC) voltage by switching current through an energy storage element such as a transformer. The duty cycle of the switching is controlled to regulate the output voltage to a desired level. Switched mode power supplies are generally efficient at heavier loads but less efficient at lighter loads. Two popular types of isolated switched mode power supplies are forward mode and flyback mode converters.

Flyback converters are common in AC voltage to DC voltage applications. A flyback converter is based on a flyback transformer that alternately builds up flux in the magnetic core and transfers energy to the output. When current is switched through the primary winding, the primary current in the transformer increases, storing energy within the transformer. When the switch is opened, the primary current in the transformer drops, and secondary current flows based on the energy stored in the magnetizing inductance labelled "Lm". When secondary current flows, the primary voltage of transformer is determined by the reflected output voltage. Even when the synchronous rectifier (SR) transistor is not conductive, secondary current could flow through internal diode at SR transistor. A controller varies the on- and off-times of a primary switch in series with the primary winding to regulate the output voltage to a desired level.

Flyback converters can be configured to switch additional reactive elements in parallel to the primary winding using a topology known as active clamp flyback (ACF). ACF converters can reduce electric stress on components and improve efficiency by achieving close to zero volt switching (ZVS) of the primary switch and produce clean drain waveforms without any ringing. They also allow soft increases in secondary current. However, while ACF converters have high efficiency at medium and heavy loads, their efficiency decreases at lighter loads due to continuous conduction losses from magnetizing currents that continuously circulate on the primary side of the transformer due to the additional reactive elements. Moreover, ACF converters are generally not used with other techniques that improve efficiency at light loads such as cycle skipping and frequency foldback.

For example, battery powered consumer electronics keep getting smaller and more powerful, but this trend requires higher power, faster, and smaller AC/DC chargers. For example, the Universal Serial Bus (USB) Power Delivery (PD) standard has started gaining popularity among smart device and laptop manufacturers. The USB PD standard allows for a higher power level (up to 100 watts (W)) and adaptive output voltage to enable the next generation of battery-powered electronics. However, existing power supply designs such as ACF converters are unable to meet these new higher power delivery requirements while maintaining high efficiency and low cost.

BRIEF DESCRIPTION OF THE DRAWINGS

The present disclosure may be better understood, and its numerous features and advantages made apparent to those skilled in the art by referencing the accompanying drawings, in which.

The use of the same reference symbols in different drawings indicates similar or identical items. Unless otherwise noted, the word "coupled" and its associated verb forms include both direct connection and indirect electrical connection by means known in the art, and unless otherwise noted any description of direct connection implies alternate embodiments using suitable forms of indirect electrical connection as well.

DETAILED DESCRIPTION

Figure 1:
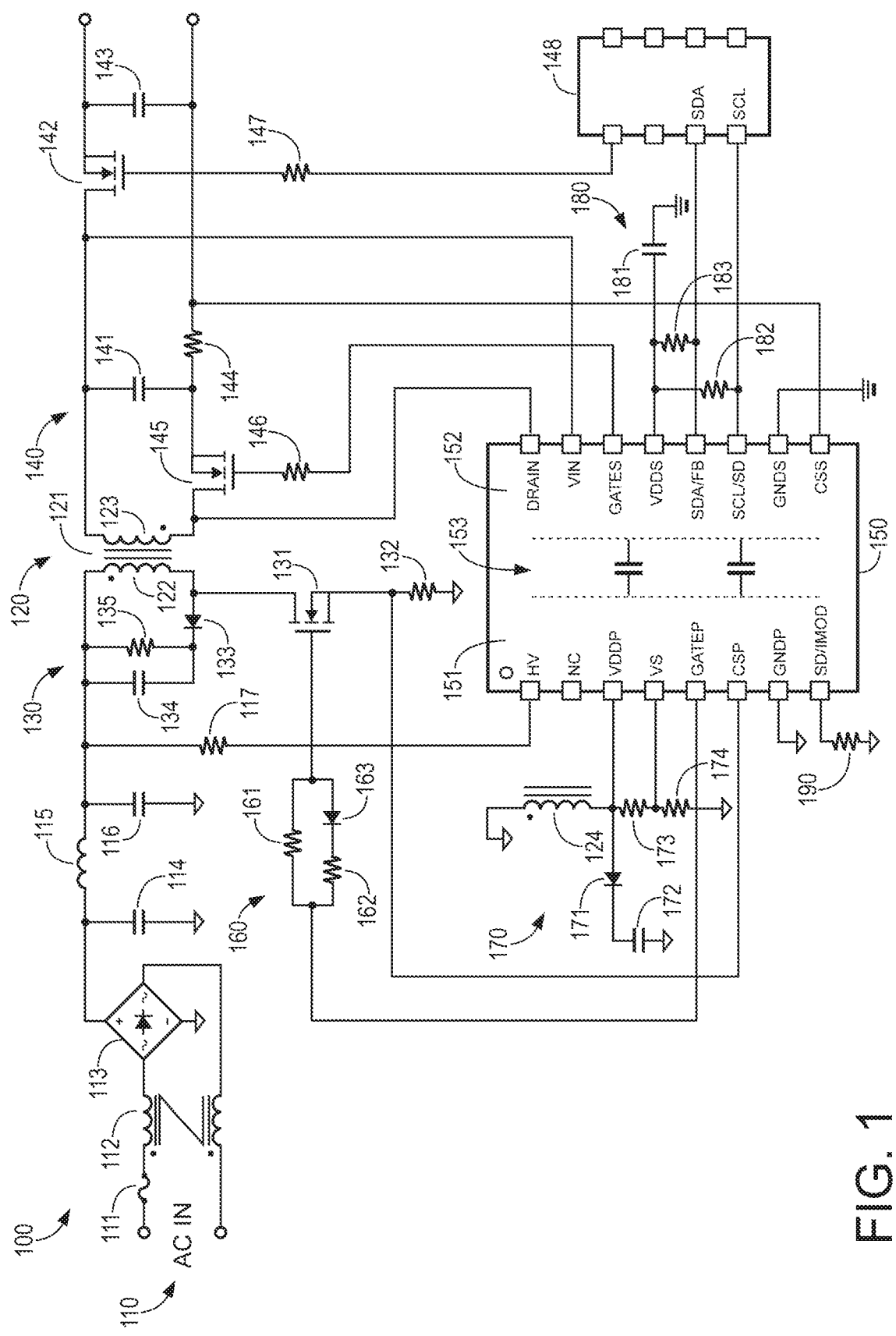
FIG. 1 illustrates in partial block diagram and partial schematic form a flyback power converter using partial zero voltage switching (ZVS) according to an embodiment of the present disclosure.

FIG. 1 illustrates in partial block diagram and partial schematic form a flyback power converter 100 using partial zero voltage switching (ZVS) according to an embodiment of the present disclosure. Flyback power converter 100 includes generally an input section 110, a transformer 120, a primary switching circuit 130, an output circuit 140, a controller 150, a drive network 160, a voltage sensing and supplying circuit 170, a secondary side circuit 180, and a resistor 190.

Input section 110 includes a fuse 111, a common mode choke 112, a diode bridge rectifier 113, a capacitor 114, an inductor 115, a capacitor 116, and a resistor 117. Input section 110 receives an alternating current (AC) input voltage labelled "AC IN" on first and second terminals thereof that may be connected, for example, to an AC mains power source. Fuse 111 has a first terminal connected to the first terminal of input section 110, and a second terminal. Common mode choke 112 has a first terminal connected to the second terminal of fuse 111, a second terminal, a third terminal connected to the second terminal of input section 110, and a fourth terminal. Diode bridge 113 has a first input terminal connected to the second terminal of common mode choke 112, a second input terminal connected to the fourth terminal of common mode choke 112, a first output terminal, and a second output terminal connected to primary ground. Capacitor 115 has a first terminal connected to the first output terminal of diode bridge rectifier 113, and a second terminal connected to primary ground. Inductor 115 has a first terminal connected to the second terminal of common mode choke 112, and a second terminal. Capacitor 116 has a first terminal connected to the second terminal of inductor 115, and a second terminal connected to primary ground. Resistor 117 has a first terminal connected to the second terminal of inductor 115, and a second terminal.

Transformer 120 has a magnetic core 121, a primary winding 122, a secondary winding 123, and an auxiliary winding 124. Primary winding 122 has a first end connected to the second terminal of inductor 115, and a second end, and has a number $N_P$ of turns. Secondary winding 123 has a first end, and a second end, and has a number $N_S$ of turns. Auxiliary winding 124 has a first end, and a second end, and has a number $N_A$ of turns".

Primary switching circuit 130 includes a transistor 131, a resistor 132, a diode 133, a capacitor 134, and a resistor 135. Transistor 131 is a high-power, N-channel metal-oxide-semiconductor (MOS) transistor having a drain connected to the second end of primary winding 122, a gate, and a source. Resistor 132 has a first terminal connected to the source of transistor 131, and a second terminal connected to primary ground. Diode 133 has an anode connected to the second end of primary winding 122, and a cathode. Capacitor 134 has a first terminal connected to the second terminal of inductor 115, and a second terminal connected to the anode of diode 133. Resistor 135 has a first terminal connected to the second terminal of inductor 115, and a second terminal connected to the anode of diode 133.

Output circuit 140 includes an output capacitor 141, a transistor 142, a bus capacitor 143, a resistor 144, a transistor 145, resistors 146 and 147, and a gate driver chip 148. Output capacitor 142 has a first terminal connected to the first end of secondary winding 123, and a second end connected to secondary ground. Transistor 142 is an N-channel MOS transistor having a drain connected to the first end of secondary winding 123, a gate, and a source connected to a first output terminal of flyback power converter 100. Bus capacitor 143 has a first terminal connected to the source of transistor 142 and to the first output terminal of flyback power converter 100, and a second end connected to a second output terminal of flyback power converter 100. Resistor 144 is a current sense resistor having a first terminal connected to the second terminal of bus capacitor 143 and to the second output terminal of flyback power converter 100, and a second terminal connected to secondary ground. Transistor 145 is an N-channel MOS transistor having a drain connected to the second end of secondary winding 123, a gate, and a source connected to secondary ground. Resistor 146 has a first terminal connected to the gate of transistor 145, and a second terminal, and has an associated resistance labeled "$R_G$". Resistor 147 has a first terminal connected to the gate of transistor 142. Gate driver chip 148 has a serial data and address terminal labeled "SDA", a serial clock terminal labelled "SCL", and a gate drive output terminal connected to the second terminal of resistor 147.

Controller 150 is an integrated primary and secondary flyback controller that includes a primary controller 151, a secondary controller 152, and an isolator 153. Primary controller 151 has a set of terminals that includes a high voltage terminal labelled "HV" connected to the second terminal of resistor 117, a primary voltage terminal labelled "VDDP" connected to the first end of the auxiliary winding of transformer 120, a voltage sense terminal labelled "VS", a primary current sense labelled "CSP" connected to the first terminal of resistor 132, a primary ground terminal labelled "GNDP" connected to primary ground, and a multi-function terminal labelled "SD/IMOD" connected to the first terminal of resistor 190.

Secondary controller 152 has a set of terminals including a drain terminal labelled "DRAIN" connected to the second end of secondary winding 123 of transformer 120 and to the drain of transistor 145, an input voltage terminal labelled "VIN" connected to the first end of secondary winding 123 of transformer 120, a secondary gate drive terminal labelled "GATES" connected to second terminal of resistor 146, a power supply voltage terminal labelled "VDDS", a serial data and feedback terminal labelled "SDA/FB", a serial clock and serial data signal labeled "SCL/SD", a secondary ground terminal labelled "GNDS", and a secondary current sense terminal labelled "CSS" connected to the first terminal of resistor 144.

Isolator 153 provides a physical and electrical isolation gap between primary controller 151 and secondary controller 152. In order for secondary controller 152 to pass switching phase information to primary controller 151, isolator 153 has one or more capacitors by which electrical signals can be passed while maintaining galvanic isolation. As shown in FIG. 1, isolator 153 has a first capacitor for transferring signals from secondary controller 152 to primary controller 151, and a second capacitor for transferring signals from primary controller 151 to secondary controller 152. In the exemplary embodiment, primary controller 151 and secondary controller 152 are implemented on separate semiconductor chips that are combined as a multi-chip module in a single integrated circuit package.

Drive network 160 includes resistors 161 and 162 and a diode 163. Resistor 161 has a first terminal, and a second terminal connected to the gate of transistor 131. Resistor 162 has a first terminal connected to the first terminal of resistor 161, and a second terminal. Diode 163 has a cathode connected to the second terminal of resistor 162, and an anode connected to the gate of transistor 131.

Voltage sensing and supplying circuit 170 includes a diode 171, a capacitor 172, and resistors 173 and 174. Diode 171 has an anode connected to the first end of auxiliary winding 124, and a cathode. Capacitor 172 has a first terminal connected to the cathode of diode 171, and a second terminal connected to primary ground. Resistor 173 has a first terminal connected to the first end of auxiliary winding 124, and a second terminal. Resistor 174 has a first terminal connected to the second terminal of resistor 173, and a second terminal connected to primary ground.

Secondary side circuit 180 includes a capacitor 181 and resistors 182 and 183. Capacitor 181 has a first terminal connected to the VDDS terminal of controller 150, and a second terminal connected to secondary ground. Resistor 182 has a first terminal connected to the VDDS terminal of controller 150, and a second terminal connected to the SDA/FB terminal of controller 150. Resistor 183 has a first terminal connected to the VDDS terminal of controller 150, and a second terminal connected to the SCL/SD terminal of controller 150.

Resistor 190 has a first terminal connected to the SD/IMOD terminal of controller 150, and a second terminal connected to primary ground. In the illustrated embodiment, resistor 190 is a negative temperature coefficient (NTC) resistor and flyback power converter 100 uses it for a thermal shutdown function.

In operation, flyback power converter 100 converts a smoothed input voltage derived from an AC source to a DC voltage. Input section 110 receives, rectifies, and filters the AC IN signal. Common mode choke 112 filters the AC IN signal to remove high frequency noise. Diode bridge rectifier 113 converts the AC IN sine wave into a full-wave rectified sine wave. Capacitors 114 and 116 and inductor 115 together form a pi filter for smoothing ripples in the full wave rectified sine wave and to present a smooth, low-ripple voltage at the first end of primary winding 122.

Transformer 120 converts the voltage on primary winding 122 into a voltage on the secondary winding 123 based on the turns ratio $N_S/N_P$, in which $N_S$ is the number of turns on secondary winding 123 and $N_P$ is the number of turns on the primary winding 122. Likewise, transformer 120 converts the voltage on primary winding 122 into a voltage on auxiliary winding 124 based on the turns ratio $N_A/N_P$, in which $N_A$ is the number of turns on auxiliary winding 124.

Flyback power converter 100 switches the smoothed, rectified voltage at the first end of primary winding 122 using transistor 131 connected to the second end of primary winding 122. Primary controller 151 switches transistor 131 by providing drive signal GATEP through a network including resistors 161 and 162 and diode 163. Resistor 132 senses the primary side current and provides a current sense signal to the CSP terminal of primary controller 151. Primary controller 151 then provides information about the primary current to secondary controller 152 over isolator 153 as part of a constant current, constant voltage ("CC/CV") control loop. Primary controller 151 receives initial power on the HV pin from the input line, through resistor 117, and after transformer 120 starts switching from auxiliary winding 124 through voltage sensing and supplying circuit 170. Voltage sensing and supplying circuit 170 also provides an indication of the line voltage on the VS terminal.

On the secondary side, gate driver chip 148 enables and disables the output voltage by turning on or turning off transistor 142. Gate driver chip 148 communicates with secondary controller 152 using a 2-wire serial link using pins SDA (serial data and address) and SCL (serial clock). Secondary controller 152 derives operating power from the VIN pin, and charges capacitor 181 through the VDDS pin to smooth the internal power supply voltage. Secondary controller 152 senses the voltage at the drain of transistor 145 using the DRAIN input, and this voltage provides polarity information for use in primary- and secondary-side switching decisions. Secondary controller 152 also senses secondary current using the CSS input, and uses the GATES pin to control the conductivity state of transistor 145.

Flyback power converter 100 uses a technique referred to as partial zero voltage switching (ZVS). As used herein, "partial zero voltage switching" and "partial ZVS" mean that the controller achieves ZVS for only a part of its operating range. As will be described more fully below, flyback power converter 100 performs ZVS when the line voltage is relatively high, when the output voltage is relatively high, and when flyback power converter 100 operates in discontinuous conduction mode (DCM). If any of these three conditions are not met, it operates without using ZVS. In other embodiments, different partial ZVS control schemes may also be used, such as high line and DCM, or high output voltage and DCM.

While in ZVS mode, flyback power converter 100 activates transistor 145 a second time to control the ZVS instant. After turning off transistor 145, secondary controller 152 detects a valley of the primary transistor's drain voltage, and then based on the CV/CS control loop, activates the secondary transistor again for a predetermined amount of time to create a negative current in the magnetizing inductance on the primary winding of the transformer. This additional current is then sufficient to fully discharge the output capacitance of transistor 131, $C_{OSS}$, ensuring that more of the energy stored in the reactive elements is recirculated and leading to higher converter efficiency.

$C_{OSS}$ is the output capacitance of a transistor, and in flyback power converter 100 is equal to the sum of the drain-to-source capacitance (Cds) and the gate-to-drain capacitance (Cgd) plus stray capacitance at primary winding 122 of transformer 120. Transistor 131 is a large power MOS transistor and has a large $C_{OSS}$ that stores energy during switching. As will be explained more fully below, controller 150 achieves better switching efficiency during ZVS operation by accounting for $C_{OSS}$ and selectively activating secondary transistor 145 a second time to more fully discharge the $C_{OSS}$ of transistor 131 and therefore achieve true ZVS.

Controller 150 includes both primary and secondary side controllers integrated in a single integrated circuit package, in which the primary and secondary controllers communicate over an isolator. Controlling both FETs by a single IC, where the CC/CV loops are implemented on the secondary side, is useful to implement the partial ZVS technique. Secondary controller 152 uses isolator 153 to communicate switching instants to the primary side.

Figure 2:
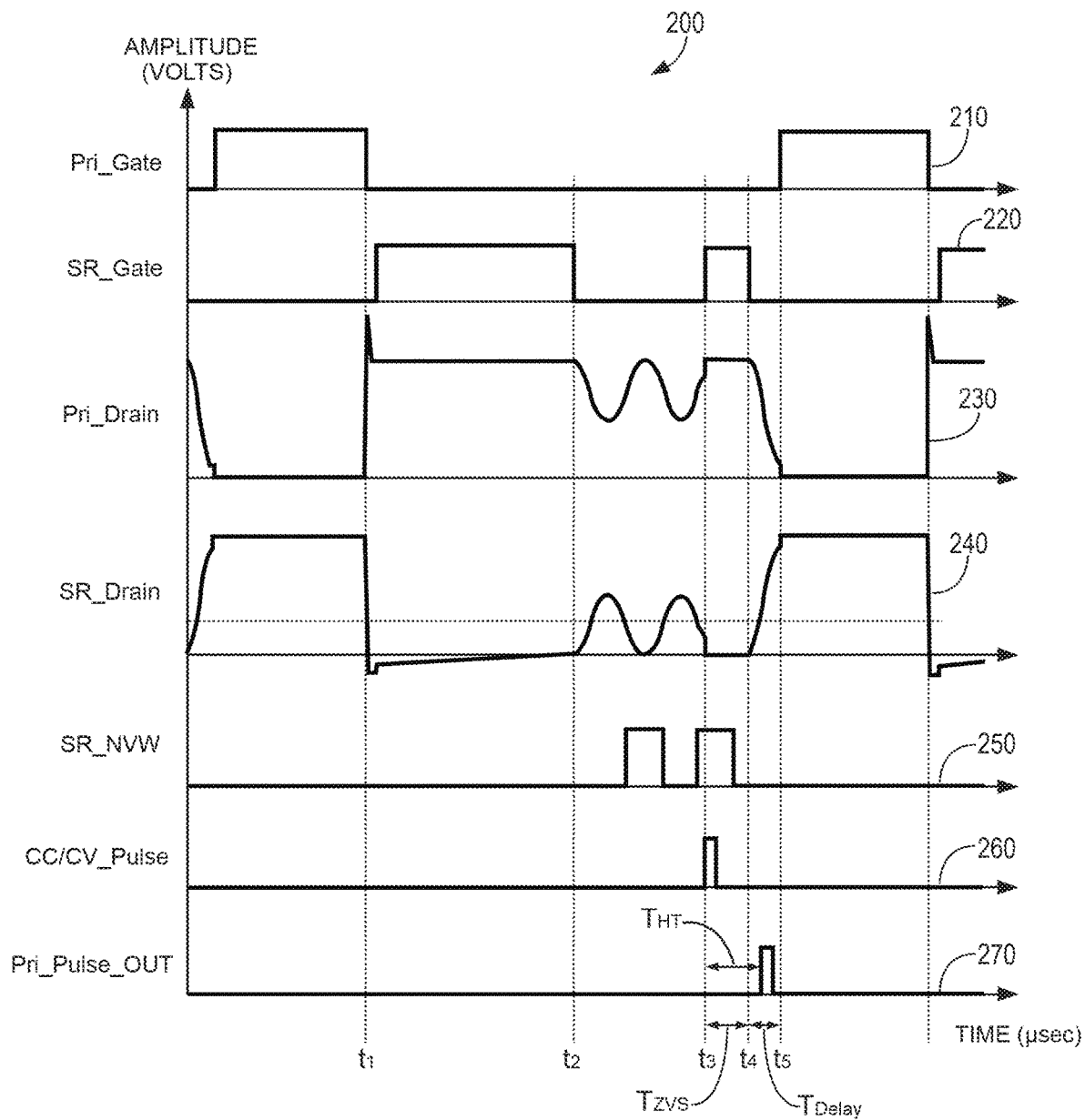
FIG. 2 illustrates a timing diagram showing the partial ZVS technique used in the flyback power converter of FIG. 1.

FIG. 2 illustrates a timing diagram 200 showing the partial ZVS technique used in flyback power converter 100 of FIG. 1. In timing diagram 200, the horizontal axis represents time in microseconds (μs), and the vertical axis represents the amplitude of various signals in volts. Shown in timing diagram 200 are waveforms of seven signals of interest, including a primary gate waveform 210 labelled "Pri_Gate", a secondary gate waveform 220 labelled "SR_Gate", a primary drain waveform 230 labelled "Pri_Drain", a secondary drain waveform 240 labelled "SR_Drain", a valley detection waveform 250 labelled "SR_NVW", a constant current, constant voltage regulation loop trigger waveform 260 labelled "CC/CV_Pulse", and a primary regulation loop trigger waveform 230 labelled "Pri_Pulse_OUT". Also shown in timing diagram 200 are five time points of interest, labelled "$t_1$", "$t_2$", "$t_3$", "$t_4$", and "$t_5$".

The sequence starts with an activation of the Pri_Gate signal. Transistor 131 is conductive, and current flows through primary winding 122, causing transformer 120 to build up flux in its core. The Pri_Drain signal falls to approximately zero volts, corresponding to voltage of the primary ground signal. At this time, the SR_Drain signal rises to a level corresponding to the line voltage, i.e. the voltage at the first end of primary winding 122. The three other control signals shown in FIG. 2, SR_NVW, CC/CV_Pulse, and Pri_Pulse_OUT, are all inactive.

At time $t_1$, primary controller 151 deactivates the Pri_Gate signal, causing transistor 131 to become non-conductive. After a transient spike around time $t_1$, the Pri_Drain signal stabilizes at the value corresponding to the rectified line voltage. A short delay after $t_1$, secondary controller 152 detects the turn-off of transistor 131 by sensing that the SR_Drain voltage falls below secondary ground. In response to detecting the reversal in polarity by the internal diode, secondary controller 152 activates the SR_Gate signal, causing transistor 145, the synchronous rectifier transistor, to become conductive and to transfer energy from the magnetic core of the transformer to the load. Secondary controller 152 keeps the SR_Gate signal active until time $t_2$, when it detects that the secondary side current has discharged to zero.

At $t_2$, secondary controller 152 deactivates the SR_Gate signal. Subsequently, the voltage on the Pri_Drain signal starts to resonate due to the magnetizing inductance of transformer 120, labeled "Lm", in parallel with output capacitance $C_{OSS}$. Capacitor 134 and resistor 135 operate as a snubber circuit. When transistor 131 turns off, leakage inductance produces a voltage spike when combined with the drain-to-source capacitance of transistor 131. When the voltage spike is greater than the sum of the line voltage, the turns ratio N times the output voltage labelled "VOUT", and the voltage across capacitor 134, then diode 133 turns on and the voltage spike is limited by the voltage across capacitor 134. The SR_Drain signal resonates with the opposite polarity. During this time, secondary controller 152 senses the resonation by comparing the SR_Drain signal with a relatively low threshold voltage, and activating the SR_NVW signal when the SR_Drain signal is below the low threshold voltage.

At time $t_3$, secondary controller 152 activates the CC/CV_Pulse according to its constant current/constant voltage control loop. If the SR_Drain signal is also in a valley as indicated by the SR_NVW signal, secondary controller 152 activates the SR_Gate signal a second time, and keeps it active for a time labeled "$T_{ZVS}$" between times $t_3$ and $t_4$. Setting $T_{ZVS}$ to an appropriate value will be explained further below. $T_{ZVS}$ can be, for example, 1 microsecond (1 µs).

The second activation of the SR_Gate signal induces negative current in the magnetizing inductance Lm, and this negative current subsequently discharges $C_{OSS}$ after transistor 145 is again deactivated between times $t_4$ and $t_5$ for an amount of time labeled $T_{DELAY}$. After time $t_4$, the voltage on the Pri_Drain starts to resonate downward, while the voltage on the SR_Drain begins to resonate upward. Once the voltage of the Pri_Drain reaches a minimum, i.e. a valley, then secondary controller 152 sends a signal to primary controller 151 to activate transistor 131, which occurs at $t_5$, and another cycle starts.

To achieve a precise ZVS instant, $T_{ZVS}$ can be adjusted to establish enough negative current in the magnetizing inductance Lm to discharge the $C_{OSS}$ of transistor 131 before the next switching cycle. $T_{ZVS}$ can be set as follows. First, the required negative current $I_{PN}$ needed to discharge $C_{OSS}$ to zero is determined. Then based on $I_{PN}$, the required amount of time needed to activate transistor 145 a second time is determined.

To fully discharge $C_{OSS}$, the energy of the magnetizing inductance must equal the energy stored in $C_{OSS}$:

$$E_{Lm.N} = E_{COSS} \quad [1]$$

Expanding equation [1] and substituting formulas for the energy in magnetizing inductance $L_m$ and the energy in $C_{OSS}$ yields:

$$\tfrac{1}{2} L_m I_{PN}^2 = \tfrac{1}{2} C_{OSS} V_{SW}^2 \quad [2]$$

Solving for $I_{PN}$ yields:

$$I_{PN} \geq \sqrt{\frac{C_{OSS} V_{SW}^2}{L_m}} = \sqrt{\frac{C_{OSS}(V_{BLK} + NV_{OUT})^2}{L_m}} \quad [3]$$

But:

$$I_{PN} = \frac{NV_{OUT}}{L_m} T_{ZVS} \quad [4]$$

Substituting equation [3] into the left side of equation [4] yields:

$$\frac{NV_{OUT}}{L_m} T_{ZVS} \geq \sqrt{\frac{C_{OSS}(V_{BLK} + NV_{OUT})^2}{L_m}} \quad [5]$$

Therefore:

$$T_{ZVS} \geq \sqrt{\frac{C_{OSS} L_m (V_{BLK} + NV_{OUT})^2}{(NV_{OUT})^2}} \quad [6]$$

$T_{ZVS}$ can be preset such as by design, set by programming fuses during final test after $C_{OSS}$ is measured, or otherwise programmed or set to match the particular system parameters. The value of $T_{ZVS}$ affects the available switching frequency. As $V_{IN}$ and $C_{OSS}$ increase, $T_{ZVS}$ increases as well, but causes the switching period to increase, and therefore the switching frequency to decrease.

Figure 3:
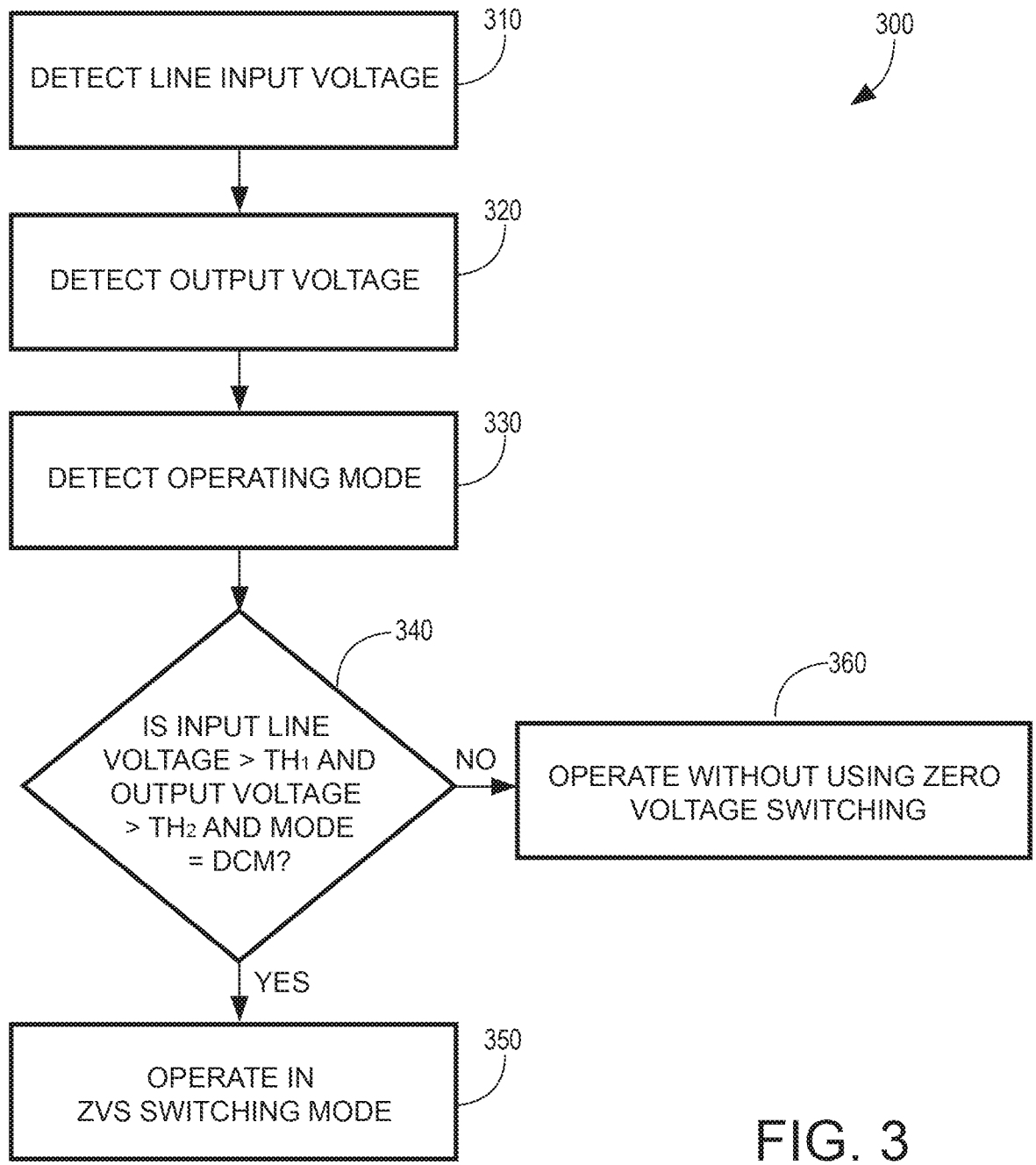
FIG. 3 illustrates a flow diagram useful in understanding the operation of the flyback power converter of FIG. 1.

FIG. 3 illustrates a flow diagram 300 useful in understanding the operation of flyback power converter 100 of FIG. 1. In action box 310, secondary controller 152 detects the line input voltage. In action box 320, secondary controller 152 detects the output voltage. In action box 330, secondary controller 152 detects the operating mode. For example, during periods of heavy loads in which high power output is required, secondary controller 152 controls primary controller 151 to operate transistor 131 at a rate fast enough that transformer 120 does not fully discharge the magnetizing inductance before another switching cycle begins. This mode is known as continuous conduction mode (CCM). On the other hand, during periods of light loads in which it is important to provide high efficiency while delivering lower total power, secondary controller 152 controls primary controller 151 to operate transistor 131 to fully discharge the magnetizing inductance before another switching cycle begins. This mode is known as discontinuous conduction mode (DCM). In decision box 340, secondary controller 152 determines whether the input voltage is greater than a first threshold labelled "$TH_1$", whether the output voltage is greater than a second threshold labelled "$TH_2$", and whether the converter is operating in DCM. If so, then the flow proceeds to action box 350, in which secondary controller 152 operates in ZVS mode. If not, then the flow continues to action box 360, in which secondary controller 152 continues to operate without using zero voltage switching.

Figure 4:
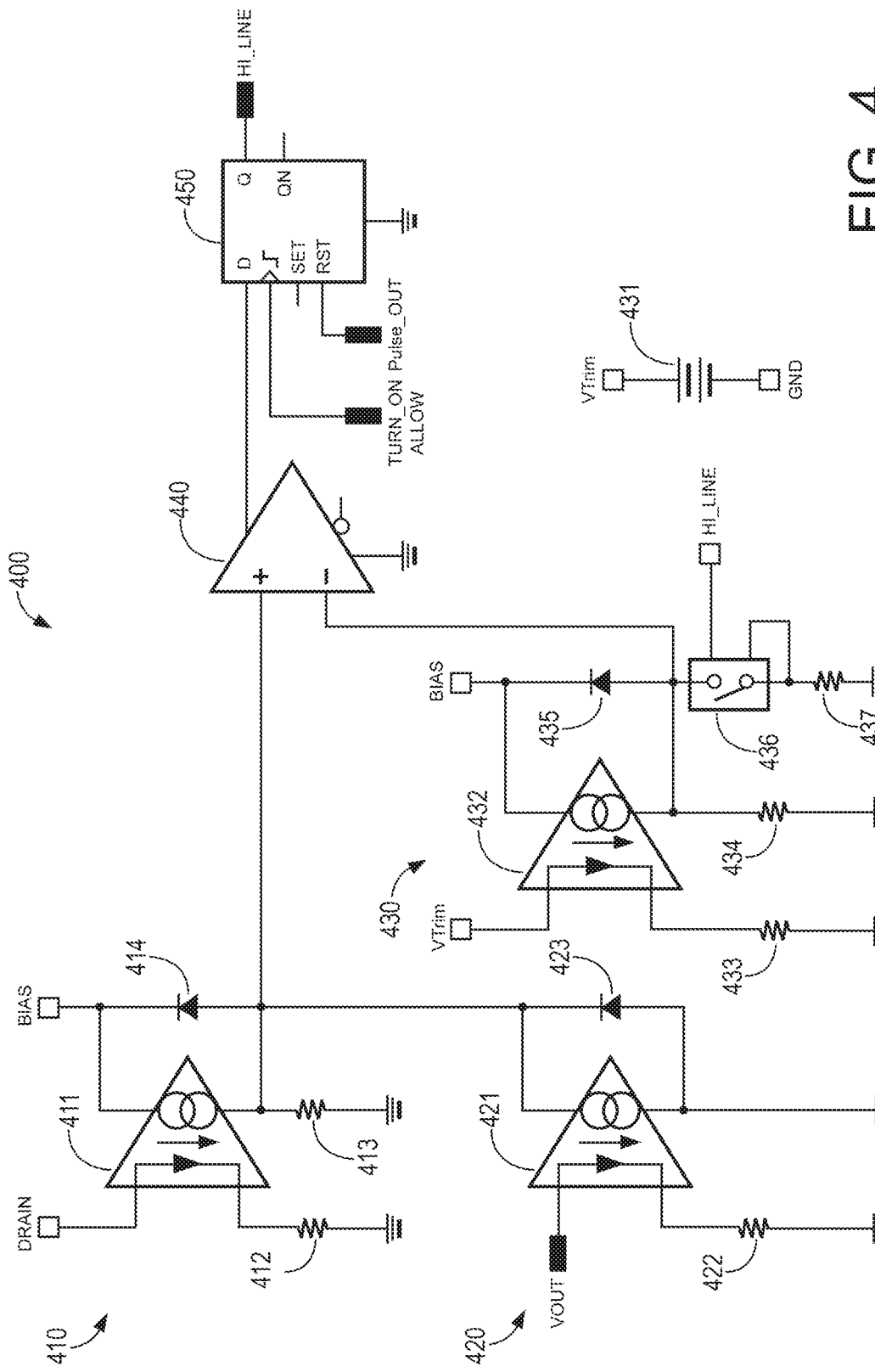
FIG. 4 illustrates in partial block diagram and partial schematic form a line voltage detection circuit used in the secondary controller of FIG. 1 to determine whether the line voltage exceeds the first threshold.

FIG. 4 illustrates in partial block diagram and partial schematic form a line voltage detection circuit 400 used in secondary controller 152 of FIG. 1 to determine whether the line voltage exceeds the first threshold. Line voltage detection circuit 400 includes generally a drain voltage detection circuit 410, an output voltage detection circuit 420, a threshold voltage generation circuit 430, a comparator 440, and an output latch 450.

Drain voltage detection circuit 410 includes a current amplifier 411, resistors 412 and 413, and a diode 414. Current amplifier 411 has a first input connected to the DRAIN terminal of secondary controller 152, a second input terminal, a first output terminal labeled "BIAS", and a second output terminal. Resistor 412 has a first terminal connected to the second input terminal of current amplifier 411, and a second terminal connected to secondary ground. Resistor 413 has a first terminal connected to the second output terminal of current amplifier 411, and a second terminal connected to secondary ground. Diode 414 has an anode connected to the second output terminal of current amplifier 411, and a cathode connected to the first output terminal of current amplifier 411.

Output voltage detection circuit 420 includes a current amplifier 421, a resistor 422, and a diode 423. Current amplifier 421 has a first input connected to the VOUT terminal of secondary controller 152, a second input terminal, a first output terminal connected to the second output terminal of current amplifier 411, and a second output terminal connected to secondary ground. Resistor 422 has a first terminal connected to the second input terminal of current amplifier 421, and a second terminal connected to secondary ground. Diode 423 has an anode connected to secondary ground, and a cathode connected to the first output terminal of current amplifier 421.

Threshold voltage generation circuit 430 includes a voltage source 431, a current amplifier 432, resistors 433 and 434, a diode 435, a switch 436, and a resistor 437. Voltage source 431 provides a voltage labeled "VTrim" measured with respect to the secondary ground voltage. In the example shown in FIG. 4, VTrim is equal to 590 millivolts. Current amplifier 432 has a first input terminal connected to voltage source 431 for receiving VTrim, a second input terminal, a first output terminal connected to the BIAS terminal, and a second output terminal. Resistor 433 has a first terminal connected to the second input terminal of current amplifier 432, and a second terminal connected to secondary ground. Resistor 434 has a first terminal connected to the second output terminal of current amplifier 432, and a second terminal connected to secondary ground. Diode 435 has an anode connected to the second output terminal of current amplifier 432, and a cathode connected to the first output terminal of current amplifier 432. Switch 436 has a first terminal connected to the second output terminal of current amplifier 432, a second terminal, and a control terminal for receiving a signal labelled "HI_LINE". Resistor 437 has a first terminal connected to the second terminal of switch 436, and a second terminal connected to secondary ground.

Comparator 440 has a positive input terminal connected to the second current output terminal of current amplifier 411, a negative input connected to the output of threshold voltage generation circuit 430, and a true output terminal.

Output latch 450 is a clocked D-type latch having a D input connected to the true output terminal of comparator 440, a clock input for receiving a signal labeled "TURN_ON ALLOW", a reset input for receiving a signal labelled "Pulse_out", a set input for receiving a complement of the Pulse_out signal, and a true output connected to the control input of switch 436 for providing the HI_LINE signal.

In operation, secondary controller 152 of FIG. 1 uses line voltage detection circuit 400 to determine whether the line voltage is high, as determined by whether it exceeds the first threshold. It relies on the property of flyback voltage converters that during the forward phase, the voltage on the drain of the synchronous rectifier transistor is proportional to the primary voltage. Thus, all control can advantageously take place on the secondary side, and secondary controller 152 can provide the appropriate switching information to primary controller 151.

In particular, drain voltage detection circuit 410 uses the voltage of the DRAIN signal to establish a current through the input side of current amplifier 411 whose magnitude is equal to the voltage of the DRAIN signal divided by the resistance of resistor 412. Current amplifier 411 conducts a current through its output side according to a current gain "K1". Thus, the voltage at the output of drain voltage detection circuit 410 at the first terminal of resistor 413 is expressed as:

$$V_{413} = \left[ \frac{\left(\frac{1}{N} \times V_{LINE} + V_{OUT}\right)}{R_{412}} \times K_{411} - \frac{V_{OUT}}{R_{422}} \times K_{421} \right] \times R_{413} \quad [7]$$

In which $$\frac{1}{n}$$

is the primary-to-secondary turns ratio. If $R_{412}=R_{422}=R_{413}$ and $K_{411}=K_{421}$, then:

$$V_{413} = \frac{1}{n} \times V_{LINE} \times K_{411} \quad [8]$$

and:

$$V_{434} = \frac{V_{Trim}}{R_{433}} \times K_{432} \times R_{434} \quad [9]$$

The HI_LINE condition is detected when $V_{413} \geq V_{434}$, thus it is detected starting when:

$$\frac{V_{Trim}}{R_{433}} \times K_{432} \times R_{434} = \frac{1}{n} \times V_{LINE} \times K_{411} \quad [10]$$

If $K_3=K_1$, then:

$$V_{Trim} = \frac{V_{Line}}{n} \times \frac{R_5}{R_6} \quad [11]$$

Note that $V_{Trim}$ can be adjusted in a variety of ways, such as with an internal trim option or by using an external integrated circuit terminal. If an external terminal is used, then $V_{Trim}$ could be adjusted using an external impedance.

Figure 5:
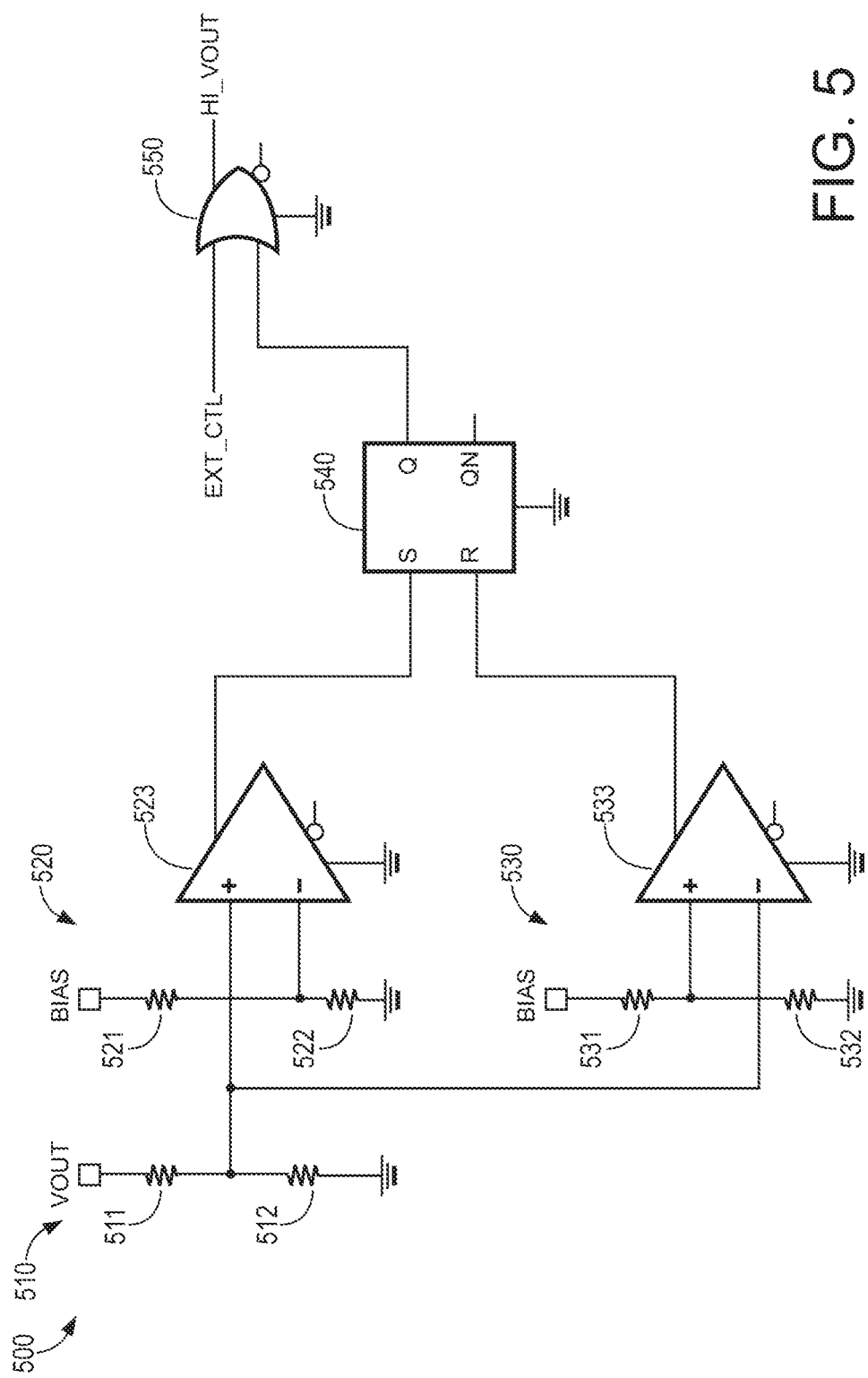
FIG. 5 illustrates in partial block diagram and partial schematic form an output voltage detection circuit used in the secondary controller of FIG. 1 to determine whether the output voltage exceeds the second threshold.

FIG. 5 illustrates in partial block diagram and partial schematic form an output voltage detection circuit 500 used in secondary controller 152 of FIG. 1 to determine whether the output voltage exceeds the second threshold. Output voltage detection circuit 500 includes generally a voltage divider 510, a high output voltage detection circuit 520, a low output voltage detection circuit 530, a latch 540, and an OR gate 550.

Voltage divider 510 includes resistors 511 and 512. Resistor 511 has a first terminal for receiving VOUT, and a second terminal. Resistor 512 has a first terminal connected to the second terminal of resistor 511, and a second terminal connected to secondary ground.

High output voltage detection circuit 520 includes resistors 521 and 522, and a comparator 523. Resistor 521 has a first terminal for receiving a signal labelled "BIAS", and a second terminal. Resistor 522 has a first terminal connected to the second terminal of resistor 521, and a second terminal connected to secondary ground. Comparator 523 has a positive input terminal connected to the output terminal of voltage divider 510, a negative input connected to the second terminal of resistor 521, and a true output terminal.

Low output voltage detection circuit 530 includes resistors 531 and 532, and a comparator 533. Resistor 531 has a first terminal for receiving the BIAS signal, and a second terminal. Resistor 532 has a first terminal connected to the second terminal of resistor 531, and a second terminal connected to secondary ground. Comparator 533 has a positive input terminal connected to the second terminal of resistor 531, a negative input terminal connected to the second terminal of voltage divider 510, and a true output terminal.

Latch 540 is an SR latch having a set input labelled "S" connected to the true output of comparator 523, a reset input labelled "R" connected to the true output of comparator 533, and a true output labeled "Q"

OR gate 550 has a first input for receiving a signal labelled "EXT_CTL", a second input connected to the Q output of latch 540, and an output for providing the HI_LINE signal.

In operation, output voltage detection circuit 500 determines whether output voltage VOUT is relatively high, i.e., above a threshold. Voltage divider 510 initially scales VOUT to a lower voltage more suitable for evaluation with CMOS logic circuits. Output voltage detection circuit 520 determines whether the scaled voltage is above a high threshold, and if so, sets latch 540. Likewise, low output voltage detection circuit 530 determines whether the scaled voltage is less than a low threshold, in which the low threshold is lower than the high threshold, and if so, resets latch 540. Thus, the combination of high output voltage detection circuit 520, low output voltage detection circuit 530, and latch 540 establishes a hysteresis on the high voltage detection operation to ensure stability in the presence of noise and interference on VOUT caused by, for example, switching transients in the load. Output voltage detection circuit 500 includes OR gate 550 so that the HI_VOUT conditional can be disabled by external control. In particular, if EXT_CTL is high, HI_VOUT is high regardless of the level of VOUT so the level of VOUT does not determine whether flyback power converter 100 operates in ZVS mode.

Entering ZVS mode based on HI_VOUT helps to avoid extending the operation switching frequency of controller 150 while in ZVS mode. In particular, since $T_{ZVS}$ is fixed, at low VOUT, the established negative magnetizing current will not be large enough to discharge $C_{OSS}$ to an acceptable voltage level. Hence, ZVS is disabled when VOUT is relatively low. In one particular example, HI_VOUT could be detected when VOUT>5 volts.

Figure 6:
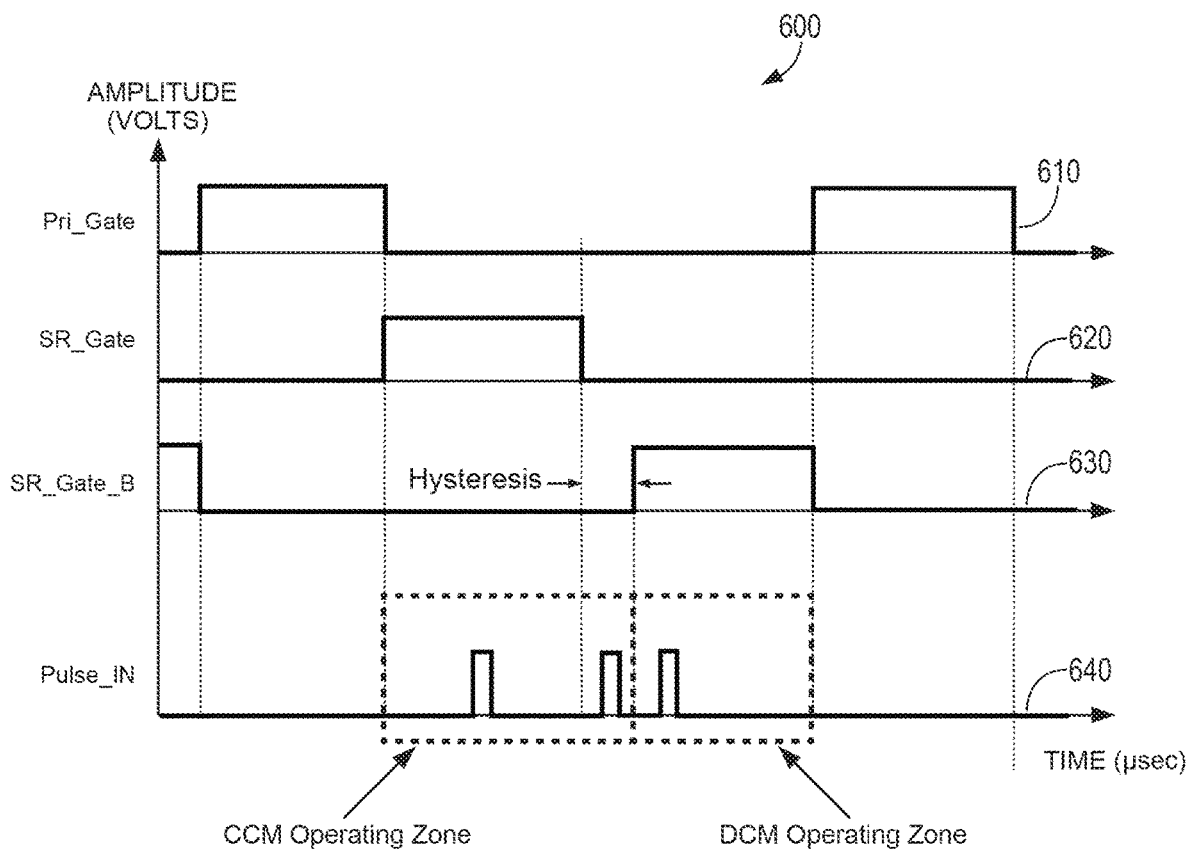
FIG. 6 illustrates in partial block diagram and partial schematic form a DCM detection circuit used in the secondary controller of FIG. 1 to determine whether the converter is operating in DCM.

FIG. 6 illustrates a timing diagram 600 that describes the operation of a DCM detection circuit (not shown) that controller 150 of FIG. 1 uses to detect whether it is operating in DCM mode. In timing diagram 600, the horizontal axis represents time in microseconds (μs), and the vertical axis represents the amplitude of various signals in volts. Shown in timing diagram 600 are waveforms of four signals of interest, including a Pri_Gate waveform 610, a first SR_Gate waveform 620, a second SR_Gate waveform 630, and a control pulse signal labeled "Pulse_IN".

As shown in FIG. 6, a first Pri_Gate pulse occurs shortly after the end of a SR_Gate_B pulse of a previous cycle Shortly after the end of the first Pri_Gate pulse, controller 150 provides a main SR_Gate pulse. Controller 150 activates the Pulse_IN signal (corresponding to the CC/CV_Pulse signal in FIG. 2) to start another switching cycle. When operating in continuous conduction mode (CCM), e.g. at a medium or heavy load, controller 150 activates the Pulse_IN signal before the end of the SR_Gate pulse plus a hysteresis period after the SR_Gate pulse becomes inactive. FIG. 6 shows this operation in a dashed box labeled "CCM operating zone", with the location of two possible pulses that would cause flyback converter 100 to operate in CCM mode. When operating in DCM, e.g. at light load, controller 150 activates the Pulse_IN signal after the end of the SR_Gate pulse plus the hysteresis period. FIG. 6 shows this operation in a dashed box labeled "DCM operating zone", with the location of a possible pulses that indicates operation in DCM mode.

Controller 150 implements the DCM detection circuit as a CMOS logic circuit that detects whether the Pulse_IN signal is activated before or after the deactivation of the SR_Gate pulse plus the hysteresis period. If the Pulse_IN signal occurs in the DCM operating zone and the other conditions for ZVS are met, then controller 150 activates transistor 145 a second time, illustrated by the activation of the SR_Gate_B signal in FIG. 6.

Figure 7:
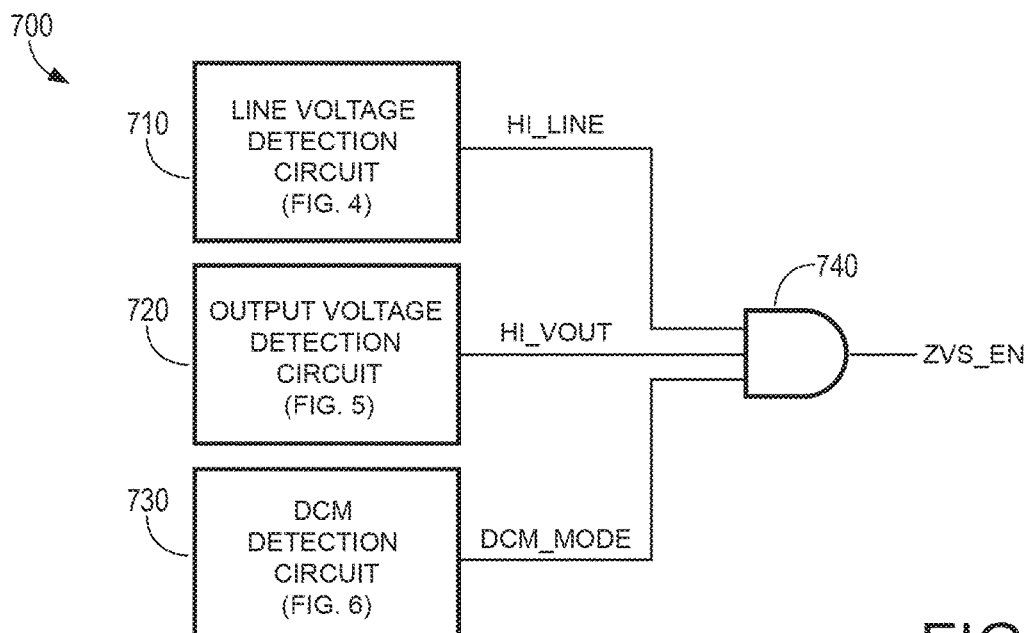
FIG. 7 illustrates in block diagram form a partial ZVS decision circuit according to an embodiment of the present disclosure.

FIG. 7 illustrates in block diagram form a partial ZVS decision circuit 700 according to an embodiment of the present disclosure. Partial ZVS decision circuit 700 includes a line voltage detection circuit 710, an output voltage detection circuit 720, a DCM detection circuit 730, and an AND gate 740. Line voltage detection circuit 710 has an output for providing the HI_LINE signal and can be implemented with line voltage detection circuit 400 of FIG. 4 or any other suitable circuit that detects whether the line voltage is above a first threshold. Output voltage detection circuit 720 has an output for providing the HI_VOUT signal and can be implemented with voltage detection circuit 720 of FIG. 5 or any other suitable circuit that detects an output voltage above a second threshold. DCM detection circuit has an output for providing a signal labelled "DCM MODE" and can be implemented with any suitable circuit that detects whether flyback power converter 100 is operating in DCM mode, such as a circuit that performs the detection illustrated in FIG. 6. AND gate 740 has a first terminal connected to the output of line voltage detection circuit 710, a second input connected to the output of output voltage detection circuit 720, a third output connected to the output of DCM detection circuit 730, and an output for providing a control signal labelled "ZVS_EN". ZVS_EN is used as an indication to controller 150 to turn on transistor 145 a second time to establish the required negative current in Lm before secondary controller 152 sends out the signal to primary controller 151 to turn-on transistor 131. Controller 150 is responsive to an activation of the ZVS_EN signal to perform ZVS valley switching as illustrated with respect to FIG. 2 above.+

Therefore, a flyback power converter that uses a partial ZVS technique and a controller and various circuits used in the controller to implement the technique have been described. The technique is known as partial ZVS because it only operates in ZVS according to operating conditions. The operating conditions used to implement the ZVS technique include operation in DCM, operation with high line voltage, and operation with high output voltage. When using this ZVS technique, a synchronous rectifier transistor is activated as is typical until the drain voltage decays to zero volts, but then is activated a second time to develop a negative current through the magnetizing inductance that can be used to fully discharge the output capacitance—$C_{OSS}$—of the switching transistor on the primary side of the transformer.

The disclosed partial ZVS technique is advantageously implemented with control on the secondary side of the transformer. For example, the line voltage can be detected using the voltage on the drain of the synchronous rectifier transistor because the magnitude of the drain voltage reflects the line voltage at the first end of the primary winding when the switching transistor on the primary side of the transformer is conductive. Moreover, the output voltage can be easily and directly detected by the secondary controller. In some embodiments, the primary and secondary controllers can be implemented using separate semiconductor chips that are combined in a multi-chip module using a single integrated circuit package. In this case, an isolator can be used to maintain galvanic isolation between the primary and secondary side circuits, but allow for communication of switching signals between them.

With the use of the disclosed partial ZVS technique, it is believed that controller 150 can meet the high power density, high switching frequency, high efficiency, and electromagnetic compatibility (EMC) standards required by the emerging USB Power Delivery (PD) standard, while maintaining low cost for applications such as an AC/DC chargers.

The above-disclosed subject matter is to be considered illustrative, and not restrictive, and the appended claims are intended to cover all such modifications, enhancements, and other embodiments that fall within the true scope of the claims. For example, the partial ZVS technique determines whether the converter is operating in DCM, whether the line (input) voltage is above a first threshold, and whether the output voltage is above a second threshold. If so, then it operates in ZVS mode. In other embodiments, ZVS mode is entered if the converter is operating in DCM mode and the line voltage is above the first threshold irrespective of whether the output voltage is above the second threshold. It yet other embodiments, ZVS mode is entered if the converter is operating in DCM mode and the output voltage is above the second threshold, irrespective of whether the line voltage is above the first threshold. In the illustrated embodiment, particular circuits were described to determine whether these conditions were met using signals available to the secondary controller, but in other embodiments other circuits that perform the same function could be used.

Thus, to the maximum extent allowed by law, the scope of the present invention is to be determined by the broadest permissible interpretation of the following claims and their equivalents, and shall not be restricted by the forgoing detailed description.

What is claimed is:

1. A controller for use in a power converter having a flyback transformer having a primary winding switched by a primary side transistor and a secondary winding switched by a secondary side transistor, comprising:
   a line voltage detection circuit for activating a high line detect signal in response to detecting that an input line voltage is greater than a first threshold;
   a discontinuous conduction mode detection circuit for activating a discontinuous conduction mode signal in response to detecting that the controller is operating in discontinuous conduction mode; and
   a switching controller coupled to said line voltage detection circuit and to said discontinuous conduction mode detection circuit for controlling said primary side transistor and said secondary side transistor using partial zero voltage switching in response to an activation of said high line detect signal and said discontinuous conduction mode signal, and controls said primary side transistor and said secondary side transistor without using partial zero voltage switching otherwise.

2. The controller of claim 1, wherein said line voltage detection circuit comprises:
   a drain voltage detection circuit for providing a drain voltage sense signal proportional to a voltage of a drain of said secondary side transistor is conductive;
   an output voltage detection circuit for providing an output voltage sense signal proportional to an output voltage of the power converter; and
   a comparator for comparing a difference between said drain voltage sense signal and said output voltage sense signal to a second threshold,
   wherein said line voltage detection circuit provides said high line detect signal in response to said comparator detecting that said difference is greater than said second threshold.

3. The controller of claim 2, wherein said line voltage detection circuit further comprises:
   a threshold voltage generation circuit having an input for receiving a trim voltage, and an output for providing said second threshold according to a high line voltage threshold and a turns ratio of said flyback transformer.

4. The controller of claim 3, wherein the controller sets the trim voltage according to the formula:

$$V_{Trim} = \frac{V_{Line}}{n} \times \frac{R_5}{R_6}$$

wherein $V_{Trim}$ is said trim voltage, $V_{Line}$ is said high line voltage threshold, n is said turns ratio of said flyback transformer, $R_5$ is a resistor in series with an input current source, and $R_6$ is a resistor in series with an output current source.

5. The controller of claim 1, wherein said discontinuous conduction mode detection circuit detects that the controller is operating in said discontinuous conduction mode in response to detecting no overlap of a triggering pulse that the controller uses to activate a primary gate drive signal to said primary side transistor in response to a control loop, and a first activation of a secondary gate drive signal to said secondary side transistor after a de-activation of a previous primary side gate drive signal.

6. The controller of claim 1, further comprising:
   an output voltage detection circuit for activating a high output voltage detect signal in response to detecting that an output voltage across said secondary winding is greater than a second threshold,
   wherein said switching controller is further coupled to said output voltage detection circuit and controls said primary side transistor and said secondary side transistor using partial zero voltage switching in response to an activation of said high line detect signal, said discontinuous conduction mode signal, and said high output voltage detect signal, and controls said primary side transistor and said secondary side transistor without using partial zero voltage switching otherwise.

7. The controller of claim 6, wherein said output voltage detection circuit comprises:
   a resistor ladder having an input for receiving said output voltage, and an output for providing a scaled output voltage signal as a predetermined fraction of said output voltage;
   a high output voltage signal detect circuit for activating a high output voltage signal in response to said scaled output voltage signal being greater than a third threshold;
   a low output voltage signal detect circuit for activating a low output voltage signal in response to said scaled output voltage signal being less than a fourth threshold, wherein said fourth threshold is lower than said third threshold; and
   a latch having a set input for receiving said high output voltage signal, a reset input for receiving said low output voltage signal, and an output for providing said high output voltage detect signal.

8. The controller of claim 1, wherein:
the controller is formed in a single integrated circuit package and has a primary controller and a secondary controller, wherein said secondary controller is galvanically isolated from and communicatively coupled to said primary controller.

9. A power converter, comprising:
a flyback transformer having a primary winding and a secondary winding;
a primary side transistor coupled in series with said primary winding;
a secondary side transistor coupled in series with said secondary winding;
a controller comprising:
  a line voltage detection circuit for activating a high line detect signal in response to detecting that an input line voltage is greater than a first threshold;
  a discontinuous conduction mode detection circuit for activating a discontinuous conduction mode signal in response to detecting that the controller is operating in discontinuous conduction mode; and
  a switching controller coupled to said line voltage detection circuit and to said discontinuous conduction mode detection circuit for controlling said primary side transistor and said secondary side transistor using partial zero voltage switching in response to an activation of said high line detect signal and said discontinuous conduction mode signal, and controls said primary side transistor and said secondary side transistor without using partial zero voltage switching otherwise.

10. The controller of claim 9, wherein said line voltage detection circuit comprises:
a drain voltage detection circuit for providing a drain voltage sense signal proportional to a voltage of a drain of said secondary side transistor is conductive;
an output voltage detection circuit for providing an output voltage sense signal proportional to an output voltage of the power converter; and
a comparator for comparing a difference between said drain voltage sense signal and said output voltage sense signal to a second threshold,
wherein said line voltage detection circuit provides said high line detect signal in response to said comparator detecting that said difference is greater than said second threshold.

11. The controller of claim 10, wherein said line voltage detection circuit further comprises:
a threshold voltage generation circuit having an input for receiving a trim voltage, and an output for providing said second threshold according to a high line voltage threshold a turns ratio of said flyback transformer.

12. The controller of claim 11, wherein the controller sets the trim voltage according to the formula:

$$V_{Trim} = \frac{V_{Line}}{n} \times \frac{R_5}{R_6}$$

wherein $V_{Trim}$ is said trim voltage, $V_{Line}$ is said high line voltage threshold, n is said turns ratio of said flyback transformer, $R_5$ is a resistor in series with an input current source, and $R_6$ is a resistor in series with an output current source.

13. The controller of claim 9, wherein said discontinuous conduction mode detection circuit detects that the controller is operating in said discontinuous conduction mode in response to detecting no overlap of a triggering pulse that the controller uses to activate a primary gate drive signal to said primary side transistor in response to a control loop, and a first activation of a secondary gate drive signal to said secondary side transistor after a de-activation of a previous primary side gate drive signal.

14. The controller of claim 9, further comprising:
an output voltage detection circuit for activating a high output voltage detect signal in response to detecting that an output voltage across said secondary winding is greater than a second threshold,
wherein said switching controller is further coupled to said output voltage detection circuit and controls said primary side transistor and said secondary side transistor using partial zero voltage switching in response to an activation of said high line detect signal, said discontinuous conduction mode signal, and said high output voltage detect signal, and controls said primary side transistor and said secondary side transistor without using partial zero voltage switching otherwise.

15. The controller of claim 14, wherein said output voltage detection circuit comprises:
a resistor ladder having an input for receiving said output voltage, and an output for providing a scaled output voltage signal as a predetermined fraction of said output voltage;
a high output voltage signal detect circuit for activating a high output voltage signal in response to said scaled output voltage signal being greater than a third threshold;
a low output voltage signal detect circuit for activating a low output voltage signal in response to said scaled output voltage signal being less than a fourth threshold, wherein said fourth threshold is lower than said third threshold; and
a latch having a set input for receiving said high output voltage signal, a reset input for receiving said low output voltage signal, and an output for providing said high output voltage detect signal.

16. The controller of claim 9, wherein:
the controller is formed in a single integrated circuit package and has a primary controller and a secondary controller, wherein said secondary controller is galvanically isolated from and communicatively coupled to said primary controller.

17. A method for selectively operating a power converter in a partial zero voltage switching mode, the power converter having a flyback transformer having a primary winding switched by a primary side transistor and a secondary winding switched by a secondary side transistor, comprising:
detecting an input line voltage;
detecting an output voltage;
detecting an operating mode of a control loop of the power converter;
operating said control loop in the partial zero voltage switching mode in response to detecting that said input line voltage is greater than a first threshold, detecting that said output voltage is greater than a second threshold, and detecting that said operating mode is a discontinuous conduction mode; and
operating said control loop in another mode besides said partial zero voltage switching mode in response to at least one of detecting that said input line voltage is less than said first threshold, detecting that said output voltage is less than said second threshold, and detecting that said operating mode is said discontinuous conduction mode.

18. The method of claim 17, wherein said operating said control loop in the partial zero voltage switching mode comprises:
- de-activating said primary side transistor;
- activating said secondary side transistor after said de-activating said primary side transistor;
- de-activating said secondary side transistor when a secondary side current, generated in response to said activating, discharges to zero;
- generating a triggering pulse in response to a secondary side control loop using valley switching after said de-activating said secondary side transistor;
- activating said secondary side transistor in response to said generating said triggering pulse and de-activating said secondary side transistor at an end of a predetermined time thereafter; and
- subsequently activating said primary side transistor in response to a drain voltage of said secondary side transistor reaching a valley.

19. The method of claim 18, further comprising:
- setting said predetermined time based on an output capacitance of said primary side transistor and a desired output voltage.

20. The method of claim 19, further comprising:
- setting said predetermined time further based on a magnetizing inductance and a turns ration of the flyback transformer.

* * * * *